| United States Patent [19] | [11] Patent Number: 5,026,790 |
|---|---|
| Tyrell et al. | [45] Date of Patent: Jun. 25, 1991 |

[54] POLYESTER COMPOSITIONS EXHIBITING ENHANCED MELT VISCOSITY

[75] Inventors: John A. Tyrell, Dalton, Mass.; S. Jack Willey, Chatham, N.Y.

[73] Assignee: General Electric Company, Pittsfield, Mass.

[21] Appl. No.: 567,205

[22] Filed: Aug. 14, 1990

[51] Int. Cl.$^5$ ............................................. C08F 20/00
[52] U.S. Cl. .................................... 525/438; 525/441; 525/442
[58] Field of Search ............... 525/437, 438, 441, 442, 525/449

[56] References Cited

U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 3,368,995 | 2/1968 | Furukawa et al. | 260/40 |
| 3,671,487 | 6/1972 | Abolina | 260/40 R |
| 3,761,450 | 9/1973 | Herwig et al. | 260/75 T |
| 3,814,725 | 6/1974 | Zimmerman et al. | 260/40 R |
| 3,962,174 | 6/1976 | Berardinelli | 260/40 R |
| 4,113,692 | 9/1978 | Wambach | 260/40 R |
| 4,124,561 | 11/1978 | Phipps, Jr. et al. | 260/40 R |
| 4,276,208 | 6/1981 | Ogawa et al. | 260/28 R |
| 4,362,836 | 12/1982 | Hoeschele | 524/322 |
| 4,394,475 | 7/1983 | Temple et al. | 524/262 |
| 4,487,797 | 12/1984 | Watson | 428/268 |
| 4,539,350 | 9/1985 | Abeelen et al. | 523/527 |
| 4,568,712 | 2/1986 | Van Abeelen et al. | 524/267 |
| 4,711,924 | 12/1987 | Salensky | 524/402 |
| 4,745,028 | 5/1988 | Das et al. | 428/391 |
| 4,990,549 | 2/1991 | Delvin et al. | |

FOREIGN PATENT DOCUMENTS

| | | |
|---|---|---|
| 53-106749 | 9/1978 | Japan . |
| 53-106750 | 9/1978 | Japan . |
| 53-14349 | 12/1978 | Japan . |
| 53-144954 | 12/1978 | Japan . |
| 53-144955 | 1/1986 | Japan . |
| 73025066 | 5/1986 | Japan . |
| 1592205 | 7/1981 | United Kingdom . |
| 1592668 | 7/1981 | United Kingdom . |

*Primary Examiner*—Earl Nielsen
*Assistant Examiner*—T. Mosley
*Attorney, Agent, or Firm*—William F. Mufatti; Spencer D. Conard

[57] ABSTRACT

Blow moldable polyester compositions are provided. The polyester compositions contain respective amounts of thermoplastic polyester resin, salt of aliphatic polycarboxylic acid and multifunctional epoxide. The compositions exhibit suitable melt strength for blow molding thereof.

12 Claims, No Drawings

POLYESTER COMPOSITIONS EXHIBITING ENHANCED MELT VISCOSITY

BACKGROUND OF THE INVENTION

1. Field of the Invention

The present invention relates to polyester compositions and more particularly relates to blow moldable polyester compositions.

2. Description of Related Art

High molecular weight linear polyesters and copolyesters of glycols and terephthalic or isophthalic acid have been available for a number of years. These are described, inter alia, in Whinfield et al., U.S. Pat. No. 2,465,319 and in Pengilly, U.S. Pat. No. 3,047,539.

Such polyesters, however, generally lack the level of melt viscosity and melt strength necessary for many blow molding applications.

Alkali metal salts of an aliphatic polycarboxylic acid containing at least 20 carbon atoms and having a molecular weight of less than about 1500 have been added to copolyester elastomers to produce blow moldable compositions having increased melt strength (See Hoeschele, U.S. Pat. No. 4,362,836.) Sodium salts of polycarboxylic acids containing up to 20 carbon atoms have been added to linear saturated polyesters as nucleating agents (See Herwig et al., U.S. Pat. No. 3,761,450.).

Triazine ring-containing epoxy compounds (e.g., triglycidyl isocyanurate or N-methyl-N,N''-diglycidyl isocyanurate) have been added to fiber reinforced polyethyleneterephthalate (PET) compositions (see JP No. 53/143449 (76.12.14)); polyfunctional compounds (e.g., polyepoxy compounds, polyisocyanate compounds, epoxysilane compounds and aminosilane compounds) have been added to glass fiber reinforced polybutylene terephthalate or polypropylene terephthalate compositions (See JP No. 53/106750 (78.09/18)); and polyfunctional compounds (e.g., polyepoxy compounds, polyisocyanate compounds, epoxy silane compounds, and aminosilane compounds) have been added to glass fiber reinforced polyester resin compositions (See JP No. 53/106749 (78.09.18)).

It has been discovered, however, that using in a polyester composition high levels of salt of a polycarboxylic acid alone can result in the composition exhibiting generally poor levels of impact strength, and using reasonable levels of the multifunctional epoxide alone does not sufficiently reduce the melt flow index.

Accordingly, one object of the present invention is to provide a blow moldable polyester composition exhibiting an enhanced melt viscosity while retaining good levels of impact strength.

SUMMARY OF THE INVENTION

The present invention involves blow moldable polyester compositions which have respective amounts of (i) a thermoplastic polyester resin, (ii) a salt of an aliphatic polycarboxylic acid, and (iii) a multifunctional epoxide. The compositions exhibit substantially enhanced levels of melt viscosity while also exhibiting good levels of impact strength.

DETAILED DESCRIPTION OF THE INVENTION

The thermoplastic polyester resins useful in the present invention contain structural units of the formula:

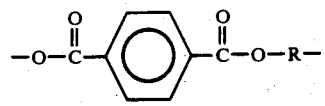

wherein R is a lower alkylene group (that is, an alkylene group containing up to 8 carbon atoms). Illustrative R values are ethylene, propylene, trimethylene, tetramethylene (1,4-butylene), pentamethylene, cyclohexanedimethylene and hexamethylene. Preferably, R is an ethylene or tetramethylene group; i.e., it is derived from ethylene glycol or 1,4-butanediol. In such cases, the linear polyester is poly(ethylene terephthalate) or poly(butylene terephthalate), identified hereinafter as "PET" and "PBT", respectively. Particularly preferred is PBT. The number average molecular weight of the linear polyester is generally in the range of about 20,000–60,000, as calculated from intrinsic viscosity or by quantitative infrared analysis of the hydroxy and carboxy end groups in the polyester.

The alkali metal salts of aliphatic polycarboxylic acids or mixtures thereof that are added to the polyester resin contain at least 20 carbon atoms, preferably from 26–54 carbon atoms, and have a molecular weight of between 300 and 1500, preferably from about 450–1000. The polycarboxylic acids used to prepare the salts must contain at least 2 carboxyl groups per molecule, preferably 2 to 4 carboxyl groups. It is believed that alkali metal salts of polycarboxylic acids containing less than 20 carbon atoms may be unsatisfactory because they may have little effect on melt strength. Salts of polycarboxylic acids having molecular weights in excess of about 1500 can exhibit phase separation leading to delamination after high shear processing. Although both saturated and unsaturated polycarboxylic acids can be used to form the salt, acids substantially free of unsaturation are preferred because they have less tendency to discolor. The concentration of salt of aliphatic polycarboxylic acid that is added to modify the polyester resin is from about 0.1% to 10% by weight, preferably 0.5% to 5% by weight, based on the total weight of the composition. Below about 0.1% the effects of the salt are not significant; above about 10% the physical properties of the polyester resin are adversely affected. Although any alkali metal can be used to form the salt, the preferred salts of the polycarboxylic acid are sodium and potassium salts, with sodium being especially preferred because of its lower atomic weight and its effectiveness in the present compositions.

Representative aliphatic polycarboxylic acids that can be used in this invention include octadecylsuccinic acid, octadecenylsuccinic acid, docosane dicarboxylic acid, dimer acid, and trimer acid, or mixtures thereof. By dimer acid is meant the $C_{36}$ dicarboxylic acid which is obtained by the dimerization of unsaturated $C_{18}$ fatty acids. By trimer acid is meant the $C_{54}$ tricarboxylic acid which is obtained by the trimerization of $C_{18}$ fatty acids. Any ethylenic unsaturation present in the dimer and trimer acids can be removed by hydrogenation. As previously indicated, saturated polycarboxylic acids are preferred. Both dimer and trimer acids containing unsaturation or saturated by hydrogenation are readily available in commercial quantities. Availability coupled with effectiveness accounts for a preference for dimer and trimer acids and, particularly, for dimer acid. The commercial grades of dimer acid normally contain at least minor amounts of starting monocarboxylic acid and higher polymers, principally trimer acid. Likewise, commercial trimer acid normally contains traces of monocarboxylic acid and larger amounts of dimer acid. Obviously, mixtures of dimer and trimer acids can be used. It should be noted that other unsaturated monocarboxylic acids containing from 16-26 carbon atoms can also be dimerized or trimerized to form polycarboxylic acids which are useful in the present invention. These materials (with the exception noted above for acids derived from $C_{18}$ monocarboxylic acids) are generally not commercially available but should be effective in the present invention.

The salts of the polycarboxylic acid are readily prepared by adding a concentrated aqueous solution of the selected alkali metal hydroxide to a solution of the acid in an alcohol, such as methanol, and isolating the resulting salt of the acid by evaporation of alcohol and water. Preferably, equivalent amounts of hydroxide and acid are used. Excess hydroxide should be avoided.

The multifunctional epoxides have an average epoxy functionality of greater than 2 epoxy groups per epoxide molecule, and more preferably an average epoxy functionality of at least 3 epoxy groups per epoxide molecule. A preferred multifunctional epoxide is obtained by reacting orthocresol novolac with epichlorohydrin and can be represented by the general formula:

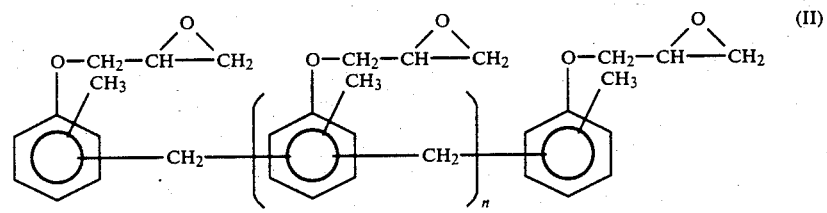
(II)

wherein n is greater than 0, preferably greater than 2, and most preferably averaging about 3.4. Another preferred multifunctional epoxide is triglycidyl isocyanurate.

The multifunctional epoxide is preferably present in the composition at a level of from about 0.05% to 10% by weight, preferably 0.1% to 2% by weight, based on the total weight of the composition.

The present compositions can be prepared by blending alkali metal salt of the polycarboxylic acid and the multifunctional epoxide with the molten polyester thermoplastic resin in high shear mixing equipment such as a screw-type extruder or a Banbury mixer. The temperatures employed will normally be about 20° C. above the melting point of the polyester.

It is important to the blow molding properties of the composition containing salts of aliphatic polycarboxylic acid and multifunctional epoxides that there is sufficient mixing in the extrusion of the resin melt.

Compounding can be carried out in conventional equipment. For example, a single screw extruder is fed with a dry blend of the polyester and the additive ingredients, the screw employed having a long transition and metering section to insure melting. On the other hand, a twin screw extrusion machine, e.g., a 30 mm Werner Pfleiderer machine can be fed with resin and additives at the feed port. The multifunctional epoxide is preferably added to the polyester resin in the form of a preextruded concentrate of polyester resin and multifunctional epoxide. In either case, a generally suitable machine temperature will be about 400° F. to 570° F.

The compounded composition can be extruded and cut up into molding components such as conventional granules, pellets, etc., by standard techniques.

It is to be understood that the foregoing compositions may contain other additives known in the art, including, but without limitation, nucleating agents, mold release agents, fillers, flow promoters, coloring agents, coupling agents, and stabilizers. The compositions may contain blends of thermoplastic polyesters such as polyethyleneterephthalate and polybutyleneterephthalate. One may readily determine which are necessary and suitable for a particular application. Preferably as a blow molding composition the composition is free of reinforcing fibers and has a melt flow index of less than 15 grams per 10 minutes using a 0.0825 inch orifice at its melt temperature and an unnotched Izod value of at least 10 foot-pounds for a ⅛" bar based on ASTM D256.

EXAMPLES

The following examples illustrate the invention. In the examples the following designations are used to denote the materials and physical tests employed:

PBT=Polybutyleneterephthalate available from General Electric Company as Valox 295.

$S_1$=Disodium salt of dimer acid prepared from 896.3 grams Empol 1010 $C_{36}$ dimer acid (from Emery Industries) and 262.4 grams of a 50% sodium hydroxide solution.

$S_2$=Sodium salt of benzoic acid.

EA=Multifunctional epoxide known as an epoxy cresol novolac represented by the formula:

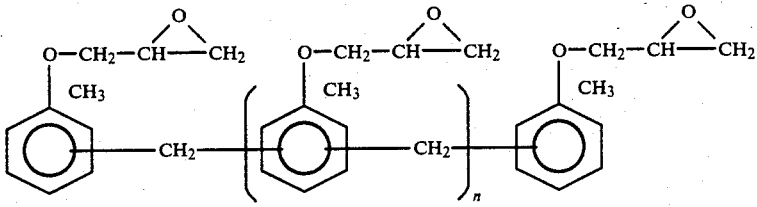

wherein n has an average value of 3.4.

EC=An 8% concentrate prepared by mixing 240 parts EA and 2760 parts PBT and extruding the mixture with a twin screw WP30 extruder.

Examples C1 to C7 and C11 to C15 are comparative examples. Examples E8 to E10 are examples illustrating the present invention. Note that examples E8 to E10 show that the compositions of the present invention exhibit low melt flow index (high melt viscosity) while exhibiting good impact strength compared to composition using either S1, S2 or EC alone.

| | EXAMPLES | | | | | | | | | | | | | | |
|---|---|---|---|---|---|---|---|---|---|---|---|---|---|---|---|
| | C1 | C2 | C3 | C4 | C5 | C6 | C7 | E8 | E9 | E10 | C11 | C12 | C13 | C14 | C15 |
| PBT | 1500 | 1500 | 1500 | 1500 | 1500 | 1500 | 1500 | 1500 | 1500 | 1500 | 1500 | 1500 | 1500 | 1500 | 1500 |
| $S_1$ | | 15 | 30 | 60 | | | | 15 | 30 | 30 | | | | | |
| $S_2$ | | | | | | | | | | | 15 | 30 | 60 | 15 | 30 |
| EC | | | | | 45 | 75 | 105 | 75 | 75 | 105 | | | | 75 | 75 |
| MFI* (g/10 min.) | 47 | 35 | 21 | 5.5 | 35 | 28 | 29 | 14 | 2.6 | 4.3 | 44 | 31 | .83 | 25 | 7.0 |
| ⅛" UNI ft. lb. (D256) | 35 | 20 | 9.3 | 6.8 | 17 | 31 | 30 | 11 | 18 | 26 | 2.1 | 1.1 | ** | 3.5 | 1.2 |

*1100 gram weight; 0.0825 inch units orifice; 250° C.
**Too brittle to mold
The above compositions were premixed and then extruded with a twin screw WP 30 extruder.

$E_8$–$E_{10}$ demonstrate the ability to achieve both an increase in viscosity (lower MFI) and good impact by the synergistic effect of the combination of $S_1$ with EC. Note that $S_2$ ($C_{11}$–$C_{15}$) does not have the effect on melt flow as $S_1$ does unless high levels are used and then the impact is very low.

What is claimed:

1. A thermoplastic polyester resin composition comprising:
   (a) a thermoplastic polyester resin;
   (b) a melt viscosity increasing amount of an alkali metal salt of an aliphatic polycarboxylic acid having a molecular weight from between 300 and 1500;
   (c) a melt viscosity increasing amount of a multifunctional epoxide having an average epoxy functionality of greater than 2.0 epoxy groups per epoxide molecule.

2. The composition of claim 1 wherein said thermoplastic polyester resin is poly(butylene terephthalate) resin.

3. The composition of claim 1 wherein said thermoplastic polyester resin is poly(ethylene terephthalate) resin.

4. The composition of claim 1 wherein said thermoplastic polyester resin is a blend of poly(butyleneterephthalate) resin and poly(ethyleneterephthalate) resin.

5. The composition of claim 1 wherein said thermoplastic polyester resin is poly(cyclohexanedimethylene terephthalate).

6. The composition of claim 1 wherein said multifunctional epoxide is triglycidyl isocyanurate.

7. The composition of claim 1 wherein said multifunctional epoxide is derived from orthocresol novolac and epichlorhydrin.

8. The composition of claim 2 wherein said multifunctional epoxide is triglycidyl isocyanurate.

9. The composition of claim 2 wherein said multifunctional epoxide is derived from orthocresol novalac and epichlorhydrin.

10. The composition of claim 1 wherein said alkali metal salt of aliphatic polycarboxylic acid is present at a level of from 0.1% to 10% by weight based on the total weight of the composition.

11. The composition of claim 1 wherein said multifunctional epoxide is present at a level of from about 0.05% to 10% by weight based on the total weight of the composition.

12. The composition of claim 10 wherein said multifunctional epoxide is present at a level of from about 0.05% to 10% by weight based on the total weight of the composition.

* * * * *